Sept. 25, 1962

M. H. LOVELACE 3,056,015

DIP-SOLDERING METHOD AND APPARATUS

Filed Sept. 30, 1960

3 Sheets-Sheet 1

INVENTOR
M. H. LOVELACE
BY John E. Wagner
ATTORNEY

Sept. 25, 1962 M. H. LOVELACE 3,056,015

DIP-SOLDERING METHOD AND APPARATUS

Filed Sept. 30, 1960

3 Sheets-Sheet 2

INVENTOR
M. H. LOVELACE
BY John E. Wagner
ATTORNEY

Sept. 25, 1962 M. H. LOVELACE 3,056,015

DIP-SOLDERING METHOD AND APPARATUS

Filed Sept. 30, 1960 3 Sheets-Sheet 3

INVENTOR
M. H. LOVELACE

BY John E. Wagner
ATTORNEY

United States Patent Office 3,056,015
Patented Sept. 25, 1962

3,056,015

DIP-SOLDERING METHOD AND APPARATUS

Monte H. Lovelace, San Fernando, Calif., assignor to The Bendix Corporation, North Hollywood, Calif., a corporation of Delaware Filed Sept. 30, 1960, Ser. No. 59,741
23 Claims. (Cl. 219—85)

This invention relates to the soldering of electrical components to supporting members or boards, and more particularly to methods and apparatus for soldering by partially immersing electrical assemblies in molten solder, known generally as dip-soldering.

In the manufacture of assemblies of electronic components, the use of printed circuit boards in conjunction with soldering techniques employing dip-soldering is now well established in the art. The prime advantages of dip-soldering are economies which may be effected by simultaneous soldering of a large number of components and increased reliability.

The use of dip-soldering techniques is not without problems, however, since it unavoidably brings the entire component assembly into the region of the high temperature of the solder bath while the conductor side of the printed circuit board is brought into contact with the solder bath. If the process is carried out rapidly in order to subject the assembly to a minimum degree of heating, there is the ever-present danger that cold-solder or crystallized joints are formed. Also, the solder bath tends to form a dross or oxide layer which must be continually removed from the surface of the bath in order to expose the assemblies to clean solder. This is often accomplished by actually pumping the solder to form somewhat of a fountain, with the component assembly mounted to pass the top of the fountain so that the under side of the assembly is contacted by clean, unoxidized solder. Regulation of the flow and height of solder fountains is difficult. Also, in such pumped solder-bath systems, a relatively large quantity of solder is required to be maintained molten and at the soldering temperature. The thermal inertia of the solder bath restricts the rate of temperature correction, and requires a substantial warm-up time to bring the apparatus to soldering temperature before successful dip-soldering may be accomplished.

It is a general object of this invention to provide methods and apparatus for dip-soldering of printed circuit boards and subminiature electronic assemblies in which the parts to be soldered are raised to an adequate soldering temperature without excessive heating of the rest of the assembly.

Another object of this invention is to provide a self-cleaning solder bath of relatively small volume and without the necessity of solder-pumping or mechanically induced agitation.

Another object of this invention is to provide a dip-soldering apparatus which has only negligible warm-up time.

The above objects of the invention are accomplished by employing an elongated bar or rod of solder material positioned in a trough and by passing electric current through the bar to melt it and to maintain it at the required temperature. The passage of current through the solder body additionally establishes an electric field surrounding the length of the body. A second source of an electric field is positioned in the region of the solder so that interaction between the field produced by the current through the solder and the field from the second source produces a reactive force on the solder body, causing localized movement of the molten solder, thereby constantly presenting a clean, unoxidized molten solder surface. Suitable transporting mechanism is positioned to move the objects to be soldered generally transverse to the length of the body over the upper surface and in contact therewith to effect the soldering operation.

In one embodiment of this invention, the additional field-producing source is the return conductor for the source of current which passes through the solder body.

In another embodiment, the field-producing source is a magnet structure of either the permanent or electromagnetic type positioned with pole pieces extending along the length of the body producing a field therethrough for producing either agitation or rotation of the molten solder body, depending on whether alternating or direct current is passed through the solder.

In still another embodiment of this invention, the heating of the solder is achieved by a central resistance heater positioned in the restraining trough of the solder, and a second field source cooperates with the field produced by the resistance heater to produce rotation or agitation of the solder body.

In still another embodiment of the invention, the solder body is positioned in a hairpin-shaped trough with current flowing through the entire body. The two parallel legs of the conductor generate the two opposing fields which produce movement of the solder in the leg portions of the trough, and two soldering surfaces are presented to printed circuit boards passed over the trough.

One feature of this invention is the utilization of the passage of current directly through a body of solder to bring the solder to molten temperature while positioned in the region of an opposing electric field which, cooperating with the field of the current in the body, results in localized movement of the solder and constant cleaning of its surface.

Still another feature of this invention is the configuration of the solder-holding trough whereby an elongated molten body of solder is produced having a substantial convex meniscus through which printed circuit boards may be passed.

Another feature of this invention involves the generation of the second field required to produce movement by positioning the return conductor of the current path through the body in parallel relationship and adjacent to the solder body.

Another feature of this invention is the use of the solder body itself when formed in the shape of a hairpin to provide the return conductor and the second field source.

One other feature of this invention is the mounting of a central resistance heater in the solder-containing trough to provide the primary heating while additionally passing a relatively low current through the solder to generate one of the two fields required to produce movement of the molten body.

Another feature of this invention relates to the incorporation of temperature-sensing elements within the body of solder and means responsive to the variation in solder temperature from a selected value for controlling the current passed through the solder.

Still another feature of this invention relates to the sensing of the level of the solder body and controlling the addition of solder whenever the level falls below the selected value.

The invention may be clearly understood from the following detailed description with reference to the drawing, in which.

Figures 1, 2, 3:
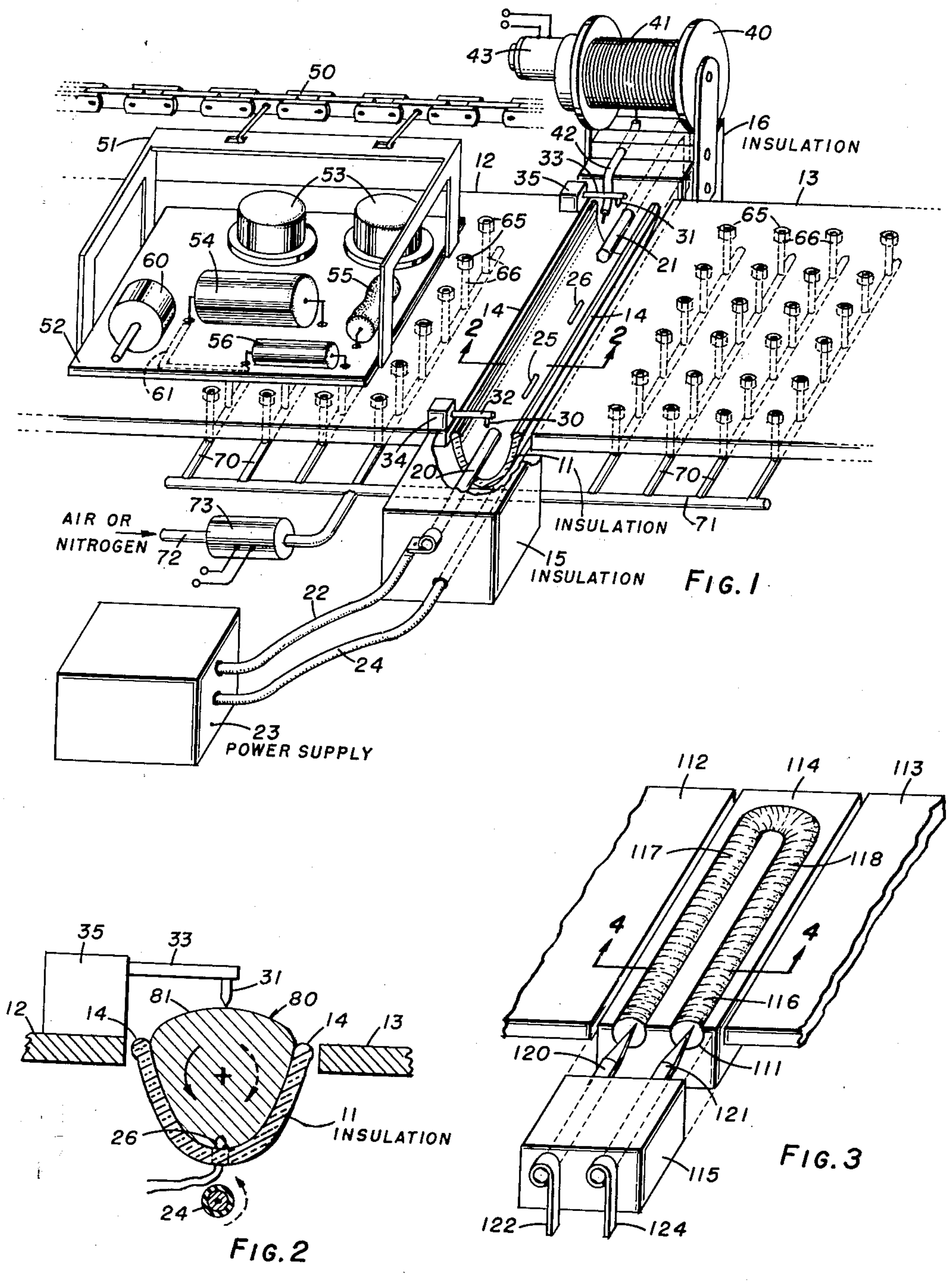
FIG. 1 is an isometric showing of dip-soldering apparatus employing the invention with parts broken away for clarity.
FIG. 2 is a fragmentary section through the apparatus of FIG. 1 along line 2—2 with solder in place.
FIG. 3 is an isometric showing, partly exploded, of another embodiment of this invention employing a hairpin-shaped body of solder.

Now referring to FIG. 1 the apparatus disclosed therein includes an elongated trough 11 which is non-wetted by solder, and preferably electrically insulated, extending across a transport table made up of a pair of platforms 12 and 13 with the upper lips 14 of the trough 11 at substantially the same level as the top of the platforms 12 and 13. Closing the ends of the trough 11 are insulating blocks 15 and 16 which further serve as support elements for a pair of embedded electrodes 20 and 21, respectively, having protruding end portions which extend from opposite ends of the trough 11. The electrode 20 has a conductor 22 secured to its outermost end to connect the electrode 20 to one terminal of a power supply 23 which is capable of furnishing a current in the order of 250 amperes at one-half volt potential.

The electrode 21 is connected at its outer end to a conductor 24 which extends through the insulating block 16 and passes directly underneath the trough 11 through insulating block 15 and is connected to the other terminal of the power supply 23. A pair of thermocouples 25 and 26 are positioned within the trough 11 approximately midway between the ends of the respective electrodes 20 and 21 and the midpoint of the trough 11. The thermocouples 25 and 26 are supported on conductors which pass through the bottom of trough 11 and are sealed thereto.

Overhanging the trough 11 are a pair of contacting fingers 30 and 31 extending downward from cantilevered arms 32 and 33 on supporting bases 34 and 35, all employed for sensing the level of liquid solder in the trough 11 under operating conditions. For clarity in FIG. 1 the apparatus is shown with the trough empty.

One or more reels 40 of solder wire 41 are supported adjacent to the ends of the trough 11 to feed solder wire 41 through guide tubes 42 into the trough 11 whenever a motor 43 is energized. The solder wire 41 is fed into the trough 11 at either of the extreme ends of the trough and away from the central portion which is employed in the soldering operation. As shown in FIG. 1, one solder reel 40 is used. However, it is desirable that a second solder reel with its drive motor be positioned adjacent the near end of the solder trough 11 as well so that solder wire may be fed from both extreme ends of the trough 11 to maintain the proper level of solder.

The apparatus also includes suitable transport mechanism, for example, a drive chain 50 carrying a number of printed circuit board carriers 51, one of which is shown in the drawing. The carrier 51 is of suitable size to straddle a printed circuit board 52 in order to carry the board over the platform 12, over trough 11 and then over platform 13. The printed circuit board 52 carries typically a number of electrical components including transistors 53, capacitor 54, diode 55, resistor 56 and potentiometer 60, all secured to the upper side of the board with leads extending through the body of the board 52 terminating on the lower side which has thereon a plurality of metallic conductors 61, one of which is shown in dotted line on the under side of the board 52, all in a manner well known in the art.

The platforms 12 and 13 include a large number of openings 65 through which extend upstanding pipes 66 communicating with a bank of feed pipes 70 joining a common trunk 71 from a supply pipe 72. Air, or preferably nitrogen, is introduced into the supply pipe 72 under pressure and distributed through the feed system to the upstanding pipe 65, and a constant flow of air or nitrogen is introduced onto the transport table. A heating element 73 surrounds the supply pipe 72 so that the air or nitrogen passing through the pipe 72 is raised to an elevated temperature in the order of 200° to 500° F. before being conducted to the transport table. The heated gas introduced above the platform 12 serves to preheat the printed circuit board 52 before it reaches the soldering trough 11, and when the gaseous material fed is nitrogen, the gas serves the further function of acting as a neutral atmosphere to prevent the oxidation of the conductors on the printed circuit board 52 to be soldered. The orifices 65 in the platform 13 serve to post-heat the printed circuit boards 52 after passing the soldering trough 11.

Preheating of the printed circuit board 52 before reaching the soldering trough tends to prevent the severing of the bond between the conductors 61 and the insulating board 52, as is an all too common occurrence when cool printed circuit boards are rapidly immersed in the dip soldering bath in accordance with prior art methods.

Post-heating of the printed circuit boards 52 causes gradual cooling and prevents the crystallization of the newly deposited solder and the unwanted formation of cold solder joints.

The operation of the soldering apparatus of FIG. 1 may be understood upon reference to FIG. 2 showing the section through the trough 11 and platforms 12 and 13 with the trough 11 filled with solder 80. Under normal operating conditions, current flows through the conductor 22 from the power source 23 of FIG. 1, through the solder body 80 and returns via conductor 24 with current flowing into the drawing as denoted by the cross in the center of the solder body 80 and out of the drawing in the conductor 24 as denoted by the dot within the conductor 24 in accordance with standard notation. The current flow through the solder body 80 melts the solder, and the surface tension of the fluid body 80 produces a convex meniscus of the upper surface 81 which extends above the lips 14 of the trough 11. In a typical installation the distance between the inner edges of the lips 14 is in the order of one-quarter inch while the meniscus of the solder body 80 rises to a level of approximately ⅛ inch above the level of the lips 14. The passage of current through the solder body 80 in the direction indicated by the cross produces electromagnetic field flux lines encircling the body 80 in the direction of the dashed arrow in accordance with the well known right hand rule. On the other hand, the passage of current through the return conductor 24 which is adjacent to the trough 11 produces a second field with flux lines extending in the direction of the dashed arrow surrounding that conductor 24. The fields of the two conductors, solder body 80 and conductor 24 are in opposition, resulting in a reactive force upon the two conductors. Conductor 24, being a relatively large copper conductor secured in the block, is not observably affected by the reaction of the two fields. However, the conductor 80 actually is a fluid mass, and the reaction of the two fields produces a force tending to rotate the solder body 80 within the trough 11 in the direction of the solid arrow. The reaction upon the solder body 80 is the readily observed rolling of the solder in the trough 11. The effect of the rolling of the solder body 80 is that any oxide formed on the surface of the meniscus is rapidly carried to the edge of the trough where it accumulates or passes over the lip 14 and out of the soldering region.

By and large, the entire meniscus portion 81 presents a shiny oxide-free surface. This meniscus portion 81 extends above the transport table so that printed circuit boards advanced along that table at an elevation of less than 1/8 inch, for example, pass through the meniscus and are immersed in the clean molten solder. The printed circuit conductors, which have previously been exposed to soldering flux, are coated with an adherent layer of solder securing all of the components into place. The preheating and post-heating of the boards, as indicated in connection with FIG. 1, insure that the printed circuit board is conditioned for the contact with the molten solder and that the solder is allowed to cool at a slow enough rate that crystallization does not occur.

As may be seen in FIG. 2, the depending finger 31 on arm 33 contacts the highest point of the meniscus portion of the solder body 80. This contact 31 is employed, as is hereinafter described, to maintain a constant level of solder within the trough 11. Also observable in the bottom of the trough 11 is the thermocouple 26 which is exposed to the moving solder and therefore detects its temperature in order that the temperature of the solder may be controlled.

The direction of current flow through the solder body 80 and the conductor 24 will, of course, remain constant if the power source 23 supplies direct current to the conductors 22 and 24 and the direction of fields will remain as shown in the drawing. If the power source 23 supplies alternating current, the current directions and field directions shown will appear instantaneously. However, the reversal of direction of current will interchange the direction of flow and the direction of the fields produced by the two current-carrying conductors. The fields generated will continue to be in opposition, and the reaction upon the solder body continues to be in the same direction. Therefore, with either alternating or direct current passing through the solder body, the body will rotate in a single direction (in the case shown in FIG. 2, in counterclockwise direction).

Referring now to FIG. 3, another embodiment of this invention includes comparable platforms 112 and 113 and positioned therebetween an insulating block 114 which may be of a high temperature such as quartz. The insulating block 114 has a hairpin-shaped trough 111 therein filled with a body of solder 116. A pair of electrodes 120 and 121 have lead-in conductors 122 and 124 connected to a power supply, unshown in the drawing but of the same type as shown in FIG. 1. The electrodes 120 and 121 are supported in a terminal block 115 which is of good dielectric material capable of withstanding the heat of operation of the system.

In the embodiment of FIG. 3 the return conductor for the solder conductor 117 is the second leg 118 of the hairpin-shaped body of solder. This allows two solder surfaces to be presented to printed circuit boards which are passed over platforms 112 and 113.

Figure 4:
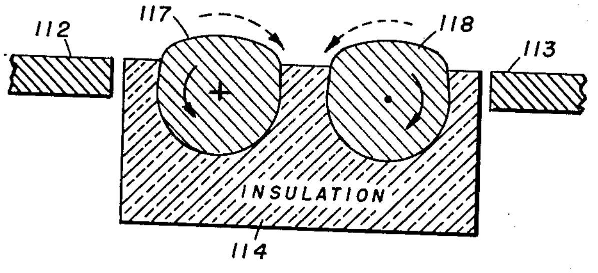
FIG. 4 is a section along line 4—4 through the embodiment of FIG. 3 under operating conditions.

The effect of passage of current through the solder 116 may be seen in FIG. 4. There, current is shown flowing into the drawing in leg 117, as denoted by the cross, and out of the drawing in leg 118, as denoted by the dot. The fields produced surrounding the current-carrying conductors 117 and 118 are denoted by the dashed arrows. The two fields interact, and the reaction between the fields produces a rotating movement, in this case in both conductors 117 and 118, causing both conductors to roll in the direction indicated by the solid arrows within the respective conductors. The two legs 117 and 118 of the body of solder roll in opposite directions, producing somewhat of a scouring effect on the under surface of the printed circuit board and preventing the possible occlusion of air bubbles in the deposited solder. Both the legs 117 and 118 present constantly cleaned solder surfaces, as in the case of the embodiment of FIG. 1.

It should be noted that in the case of the embodiment of FIG. 3, printed circuit boards having continuous conductors extending in the direction of movement along the platforms tend to constitute short circuits between the two legs 117 and 118 of the solder body. Of course, the passage of current indiscriminately through the printed circuit during the operation of soldering is unwanted and might be expected in certain cases to cause damage to the components affixed to the board. However, in the normal operation of this invention the voltage applied to the solder body is in the order of one-half to two and one-half volts. Therefore the total potential which might be applied across a section of conductor or of the pair of terminals of a device affixed to the board would be less than that value. Also, in a typical embodiment the cross-sectional area of the solder trough is in the order of one square centimeter presenting a unit resistivity of 16 micro-ohms per centimeter of length. Therefore, in a solder conductor of ten centimeters length the resistance of the solder is in the order of 100 to 200 micro-ohms. Consequently any board passing over the legs 117 and 118 in the embodiment of FIG. 4 are subjected only to an extremely low voltage. Therefore, the passage of current through the printed circuit board and its components is definitely negligible, and the likelihood of damage to the assembly is virtually nonexistent.

Figures 5, 6, 7:
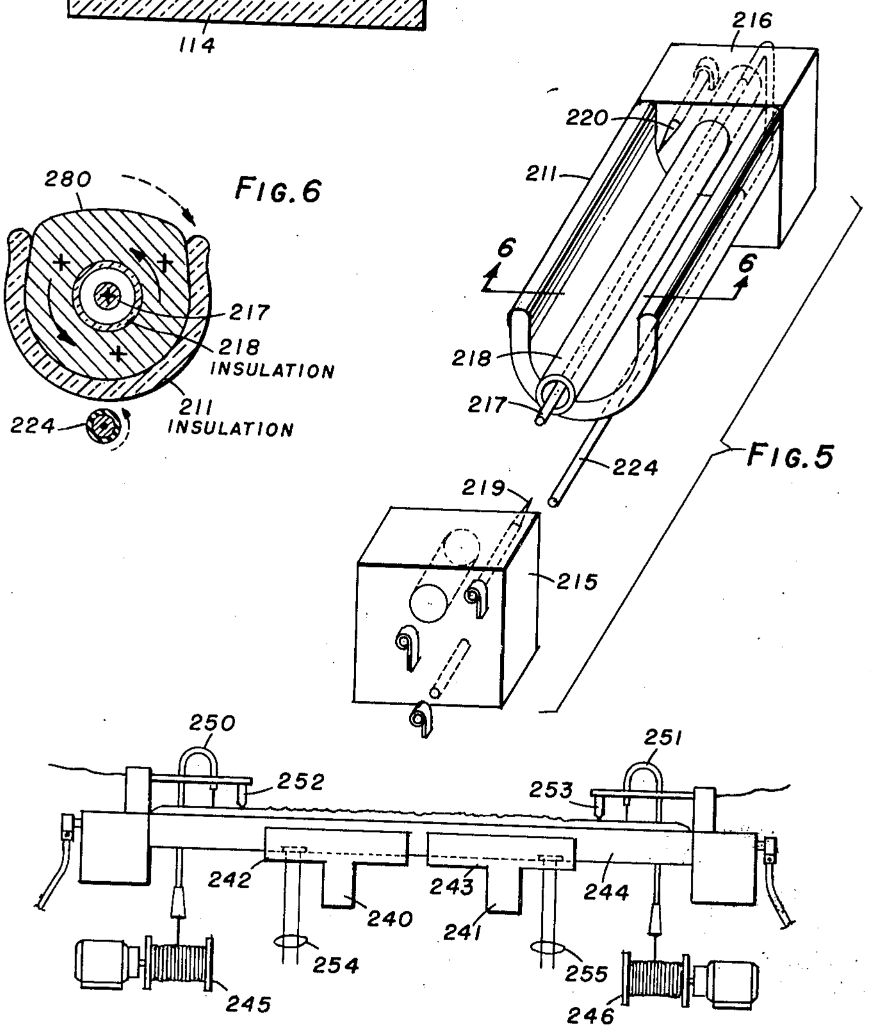
FIG. 5 is a perspective view, partly exploded, and partly broken away for clarity, showing another embodiment of the invention incorporating a resistance heater.
FIG. 6 is a simplified section along line 6—6 of FIG. 5 under operating conditions.
FIG. 7 is a simplified vertical sectional view of another embodiment of the invention employing a magnet-produced field.

In certain cases it may be considered desirable that the assembly to be soldered be protected from major current-carrying conductors, and this can be accomplished, still employing the concept of this invention and obtaining the advantages of small size, accurate control of temperature and constant solder cleaning by employing the embodiment shown in FIG. 5. In FIG. 5 a trough 211, closure 216, terminal block 215 and return conductor 224 virtually identical with their counterparts in FIG. 1 are employed. A central resistance heater 217 within an insulating tube 218 positioned along the axis of the solder body forms the primary conductor. This resistance heater serves the function of heating the solder held by the trough to the soldering temperature. A current is introduced into the molten solder through electrodes 219 and 220 just sufficient to provide an electromagnetic field. The return conductor 224 likewise produces a field which is in opposition to the field produced by the current passed through the solder in the trough 211. The interaction of the two fields provides a reactive force which acts upon the solder body to cause its rotation.

The operation of the embodiment of FIG. 5 is illustrated in the sectional drawing of FIG. 6. The position of the resistance heater 217 and its surrounding insulating tube 216 in the center of the mass of solder 280 may be seen in the drawing. The direction of current flow in the resistance heater 217 and the solder body in FIG. 6 is into the drawing, and the return flow from the heater 217 in the conductor 224 is out of the drawing. The field produced by the currents through the solder and the return conductor 224 are opposing, as shown by the dashed arrows, and the reactive force on the molten body of solder causes movement in the direction of the solid arrows.

In each of the embodiments described above, the second field which cooperates with the field of currents through the solder body or its resistance heater is furnished by the return conductor of the same current path. This preferred arrangement is not the only one available, and the second field may be furnished by one or more magnets positioned with pole pieces adjacent to the trough so that the lines of force from the magnet pass through the trough containing the solder. Such an embodiment appears in FIG. 7. Two magnets 240 and 241 are shown with extended pole pieces 242 and 243, respectively, paralleling the length of the trough 244. Also in FIG. 7, the dual solder sources may be readily seen, including the solder drums 245 and 246 with guide tubes 250 and 251. For convenience, the solder drums 245 and 246 are shown positioned below the level of the trough 244. Dual contactors 252 and 253 likewise appear in FIG. 7, as well as the leads 254 and 255 for thermocouples in the trough 244.

In operation of the embodiment of FIG. 7, the current passing through the solder in trough 244 melts the solder and generates an alternating field when alternating current is applied to the electrodes. The magnets 240 and 241, which may be of the permanent type, establish unvarying fields substantially confined to the region between their pairs of pole pieces. The interaction between the alternating and fixed fields produces an alternating reaction on the solder in the trough. This effect may be observed by the generation of ripples on the entire surface of the solder in the region of the two fields. The agitation produced maintains the solder in constant movement, with the resulting continuous exposure of clean solder to printed circuit boards passing over the trough.

Where direct current is passed through the solder in the embodiment of FIG. 7, the magnets 240 and 241 should be of the electromagnetic type and supplied with an alternating current. The same effect of agitation is produced, as above described, since interaction still exists between the fixed and alternating fields.

It may be apparent from the drawing that the solder bath is only of minimum width by comparison to prior art dip-soldering equipment, as an example, having a width of one-quarter inch. The length is sufficient to exceed the maximum lateral dimension of the printed circuit board. Systems employing this invention may be readily adapted to the soldering of microminiature component assemblies, in which case typical solder trough dimensions are a length in the order of one to two inches and a width of approximately 3/16 inch.

Figure 8:
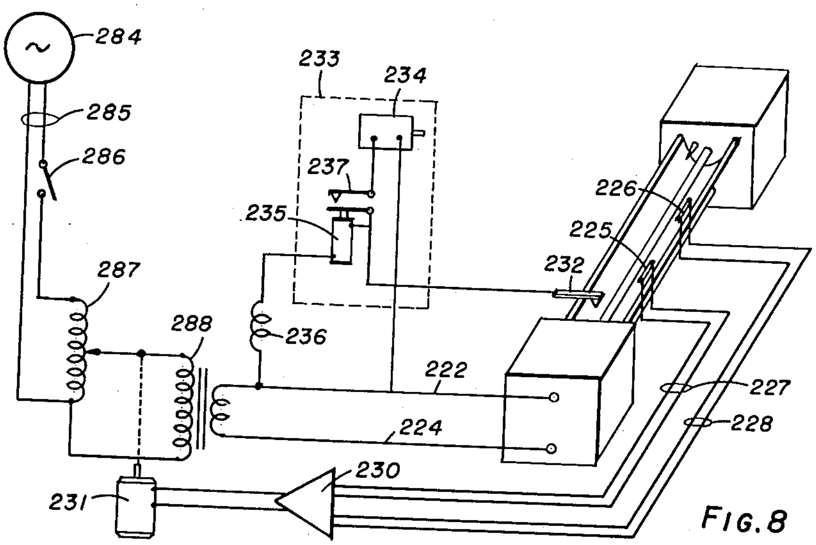
FIG. 8 is an electrical schematic drawing of the invention.

The accurate control of both temperature and quantity of solder available in the small apparatus is accomplished employing the circuitry of FIG. 8. A power source, in this case a generator 284 (e.g., 115 v. supply), is connected to line conductors 285 and line switch 286 to a voltage controller 287, and then to a step-down transformer 288 having a turns ratio in the order of 25 to 1 to produce the low voltage in the order of one-half to 5 volts and a current of 250 amperes. The current from the step-down transformer 288 is introduced by leads 222 and 224 to the solder bath. The thermocouples 225 and 226 in the trough meter the temperature of the solder body, and the output voltage developed by the thermocouples 225 and 226 is introduced over leads 227 and 228, respectively, to a servo amplifier 230 which in turn controls a dual direction motor 231 coupled to the voltage controller 287. The amplifier is designed to provide an error signal when the voltage output of either of the thermocouples departs from a preselected value. The motor 231, by rotating the wiper arm of the voltage controller 287, varies the current to the solder body and thereby varies its temperature. This automatic fast-acting control system allows the rapid correction of the temperature of the solder bath. The electrical control of the temperature is direct, since the temperature of the solder bath is a function of the $I^2R$ loss in the solder, and merely varying the current varies the temperature. For even faster temperature control, the electromechanical servo system of FIG. 8 may be replaced by a thyratron or other electronic current control.

Solder level control is accomplished employing one or more contactor elements 232 touching the upper surface of the meniscus and connected to the operating circuit 233 of motor 234 for the solder reel, not shown in the drawing. When the level of solder in the trough falls below the normal level, and contactor 232 opens the circuit through a normally operated relay 235 and an auxiliary winding 236 of transformer 288, and the back contact 237 of relay 235 energizes motor 234, solder is fed into the bath.

Figure 9:
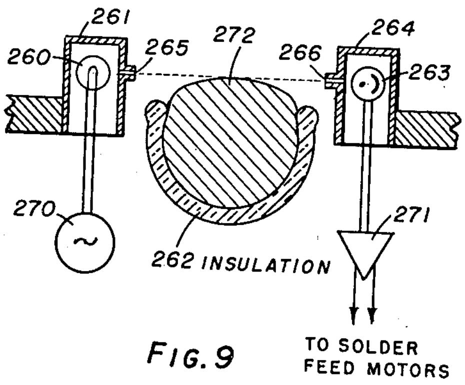
FIG. 9 is a simplified elevational section through apparatus in accordance with the invention incorporating photoelectric solder level metering.

A noncontact method of metering the solder level is illustrated in FIG. 9. It employs a light source 260 within an apertured enclosure 261 positioned on one side of trough 262 and a photoresponsive element 263 in a similar enclosure 264. The enclosures 261 and 264 have aligned slits 265 and 266 to restrict the passage of light from source 260 to photoresponsive element 263. Source 260 is connected to a power supply 270, and photoresponsive element 263 is connected to a servo amplifier 271 which controls the feed of solder to the trough 262.

The slits 265 and 266 in the enclosures 261 and 264 are at such a level that light passing therethrough will be intercepted by the meniscus 272 of the molten solder when it reaches the soldering level. If the solder meniscus falls below the required level, light from source 260 striking photoresponsive element 263 energizes that element and produces an output voltage which is raised in level by amplifier 271 of the type shown in FIGS. 1 and 7 to add solder to the trough 262 and raise the level of the meniscus 272.

Both the contact method of solder level determination of FIGS. 1 and 7 and the photoelectric method of FIG. 9 allow accurate level control, since both sense the height of the meniscus. Each has its advantages; however, owing to the simplicity, the system of FIGS. 1 and 7 is preferred.

It may therefore be seen that in accordance with the teaching of this invention a miniature dip-soldering apparatus is provided which has the characteristics of rapid, accurate temperature control, the exposure of the components to be soldered to a minimum duration of the high soldering temperature, and continual self-cleaning of the solder bath. The passage of current through the elongated solder body provides the heating to soldering temperature of the solder, and through the interaction of the field produced by that current flow and a second external field, the continual cleaning of the bath is accomplished.

Although for the purpose of explaining the invention a particular embodiment thereof has been shown and described, obvious modifications will occur to a person skilled in the art, and I do not desire to be limited to the exact details shown and described.

I claim:

1. Dip-soldering apparatus comprising:
an elongated trough for holding solder;
electrode means positioned to apply an electrical potential between spaced portions of a continuous body of solder contained within the trough;
means for applying an electrical potential to said electrodes to melt solder in said trough and to establish an electromagnetic field along said trough around the solder;
means for establishing an opposing electromagnetic field in the region of said trough whereby the interaction of the two fields produces a reactive force on the solder and resultant localized movement of molten solder in the trough.

2. Dip-soldering apparatus comprising:
a trough for holding solder;
electrode means for applying an electric potential between spaced portions of said trough;
a current source connected to said electrode means for passing current through solder material positioned in said trough between said electrodes to melt the soldering material and to establish an electromagnetic field in the region of the solder material;
means for establishing an opposing electromagnetic field in the region of said trough whereby the interaction of the two fields produces a reactive force on the solder and resultant localized movement of the molten solder in the trough; and
means for passing assemblies to be soldered over said trough in contact with the upper surface of the molten solder.

3. The combination in accordance with claim 2 wherein said trough has a width of less than the order of one-half inch whereby molten soldering material therein forms a substantially continuously curved convex meniscus.

4. The combination in accordance with claim 2 wherein said trough is of substantially semicircular cross-section whereby molten solder held therein assumes a generally circular cross-sectional shape.

5. The combination in accordance with claim 4 wherein said second field-producing means produces a field which continuously opposes the field produced by current flow through solder material in said trough, and a continuous reactive moment is applied to the solder material whereby the solder material continuously rolls in said trough.

6. The combination in accordance with claim 5 wherein said means for passing assemblies over said trough is operative to move assemblies generally transverse to the axis of rotation of the molten solder.

7. Dip-soldering apparatus comprising:
an enlongated trough for holding solder;
means for passing current through said trough to melt solder contained therein and to generate an electromagnetic field in the region of said trough;
means for establishing an opposing electromagnetic field in the region of said trough whereby the interaction of the two fields produces a reactive force on the solder and resultant localized movement of the molten solder in the trough; and means positioned within said trough for sensing the temperature of molten solder in the trough and means responsive to variations in temperature of the solder from a selected level for varying the current flowing between said electrodes.

8. The combination in accordance with claim 7 wherein said trough is of generally semicircular cross-section and said sensing means comprises a thermocouple positioned within said trough to sense the temperature of the peripheral region of the molten solder therein.

9. Dip-soldering apparatus comprising:
an elongated trough for holding solder;
a source of electrical current;
a pair of spaced electrodes extending into said trough for introducing current into solder within said trough to melt the solder and to establish an electromagnetic field in the region of said trough;
an electrical conductor extending parallel to the length of said trough and adjacent thereto;
a source of current for said conductor, the magnitude and direction of current flow from said last source being such that an electromagnetic field is produced in the region of said trough substantially equal in magnitude and opposed to the electromagnetic field produced by current flow through the solder in said trough whereby the interaction between said two fields produces a reactive force on the solder and resultant movement of the molten solder in the trough.

10. The combination in accordance with claim 9 wherein the body of solder within the trough and said electrical conductor are connected so that the flow of current in the solder and in the electrical conductor is in opposite directions.

11. The combination in accordance with claim 10 wherein said electrical conductor and the body of solder within the trough are electrically connected in series to a common current source whereby current of the same magnitude flows therethrough.

12. Dip-soldering apparatus comprising:
an elongated dielectric body including a substantially planar upper surface and a hairpin-shaped trough in the upper surface for holding solder;
a first electrode extending into one of the end regions of said hairpin trough;
a second electrode extending into the other end region of said hairpin trough;
a current source connected to said electrodes so as to pass current through solder forming a continuous conductor between said first and second electrodes;
the flow of current through the solder being operative to melt the solder and to produce opposing electromagnetic fields surrounding the solder conductor portions in the legs of said hairpin trough whereby reactive forces on said molten solder conductor portions tend to produce rotation thereof.

13. Dip-soldering apparatus comprising:
a dielectric body including a substantially planar upper surface and a continuous solder-holding trough having a pair of straight portions in spaced juxtaposed relation;
a first electrode extending into one end region of one of said straight portions;
a second electrode extending into one end region of the second of said pair of straight portions whereby a continuous electrical current path is established between said first and second electrodes when said trough is filled with solder, with the current paths through said straight portions being in opposite directions;
a source of current connected to said electrodes whereby current flow between said first and second electrodes melts solder held by said trough and establishes an electromagnetic field surrounding the solder in respective straight portions being in opposition, and the opposing fields provide reactive forces on the molten solder in said straight portions and resultant transverse movement of solder in said trough.

14. The combination in accordance with claim 13 wherein the straight portions of said trough are of substantially semicircular cross-section and the reactive forces on the solder therein rolls about the longitudinal axis of said portions.

15. The combination in accordance with claim 14 wherein said straight portions have a maximum transverse dimension of the order of one-half inch whereby molten solder in said trough forms a substantially semicircular convex meniscus.

16. The combination in accordance with claim 15 wherein said apparatus includes means for sensing the level of the meniscus of the solder and means responsive to the sensing of solder meniscus below a predetermined level for introducing additional solder into said trough in a region remote from said straight portions.

17. The combination in accordance with claim 16 wherein said apparatus includes means positioned in said trough in one of said straight portions for sensing the temperature of molten solder therein and means responsive to variations in temperature from a selected value detected by said sensing means for varying the current applied to said electrodes.

18. Dip-soldering apparatus comprising: an elongated trough of dielectric material for holding solder;
heater means extending longitudinally through said trough;
a current source for said heater to provide a heating current for melting solder within said trough,
a second current source connected to spaced portions of solder within said trough for establishing an electromagnetic field extending along the molten solder; and
means external to said trough for establishing an electromagnetic field extending along said trough and opposing the field produced by said second current source.

19. Dip-soldering apparatus comprising:
an elongated trough of generally semicircular cross-section of dielectric material for holding solder;
a resistance heater rod axially positioned within said trough and extending along the major length thereof;
a current source for said resistance heater for melting solder within said trough, a second current source connected to spaced portions of solder within the trough for establishing an electromagnetic field having lines of flux encircling said trough along at least a portion thereof; and
means external to said trough for establishing an electromagnetic field extending along said portion of said trough and opposing the field produced by current flow through the solder producing localized movement thereof.

20. Dip-soldering apparatus comprising:

an elongated trough for holding solder;

electrode means positioned to apply an electrical potential between spaced portions of a continuous body of solder contained within the trough;

means for applying an electrical potential to said electrode to melt solder in said trough and to establish an electromagnetic field along said trough around the solder; and magnet means positioned to establish a second electromagnetic field generally transverse to said trough whereby the interaction of the two electromagnetic fields produces a reactive force on the body of solder producing movement thereof.

21. The combination in accordance with claim 18 wherein said potential-applying means introduces an alternating potential into said trough producing an alternating electromagnetic field, and the interaction of the alternating field with the field of said magnet means produces agitation of the solder within said trough.

22. A method of soldering printed circuit boards comprising:

supporting an elongated body of solder;

passing electric current through the elongated body to melt the solder and to establish a magnetic field around the body;

establishing an opposing magnetic field in the region of said body of solder whereby the interaction of the fields produces a reactive force upon the molten body of solder and to produce localized movement thereof; and passing a printed circuit board to be soldered generally transverse to the body of solder in contact therewith to apply solder to the required portions of the printed circuit board.

23. A method of soldering printed circuit boards comprising:

supporting an elongated body of solder of generally circular cross-section;

passing an electrical current through the body of solder to melt the solder and to establish an alternating magnetic field surrounding the body of solder;

establishing an opposing electromagnetic field in the region of said body whereby the interaction of the fields produces a rotating moment in the molten body of solder with an axis along the length of the body of solder to cause the body of solder to roll; and passing a printed circuit board to be soldered generally transverse to the axis of movement of the solder body and in contact therewith.

References Cited in the file of this patent

UNITED STATES PATENTS

| | | |
|---|---|---|
| 1,947,689 | Young | Feb. 20, 1934 |
| 2,619,063 | Anderson | Nov. 25, 1952 |
| 2,632,082 | Reichelt | Mar. 17, 1953 |
| 2,643,201 | Chadsey et al. | June 23, 1953 |
| 2,665,319 | Dreyfus | Jan. 5, 1954 |
| 2,869,497 | Lehner | Jan. 20, 1959 |

FOREIGN PATENTS

| | | |
|---|---|---|
| 794,219 | Great Britain | Apr. 30, 1958 |